(No Model.) 5 Sheets—Sheet 1.
G. R. KRESS.
MACHINE FOR MAKING ROPE, &c.
No. 438,627. Patented Oct. 21, 1890.
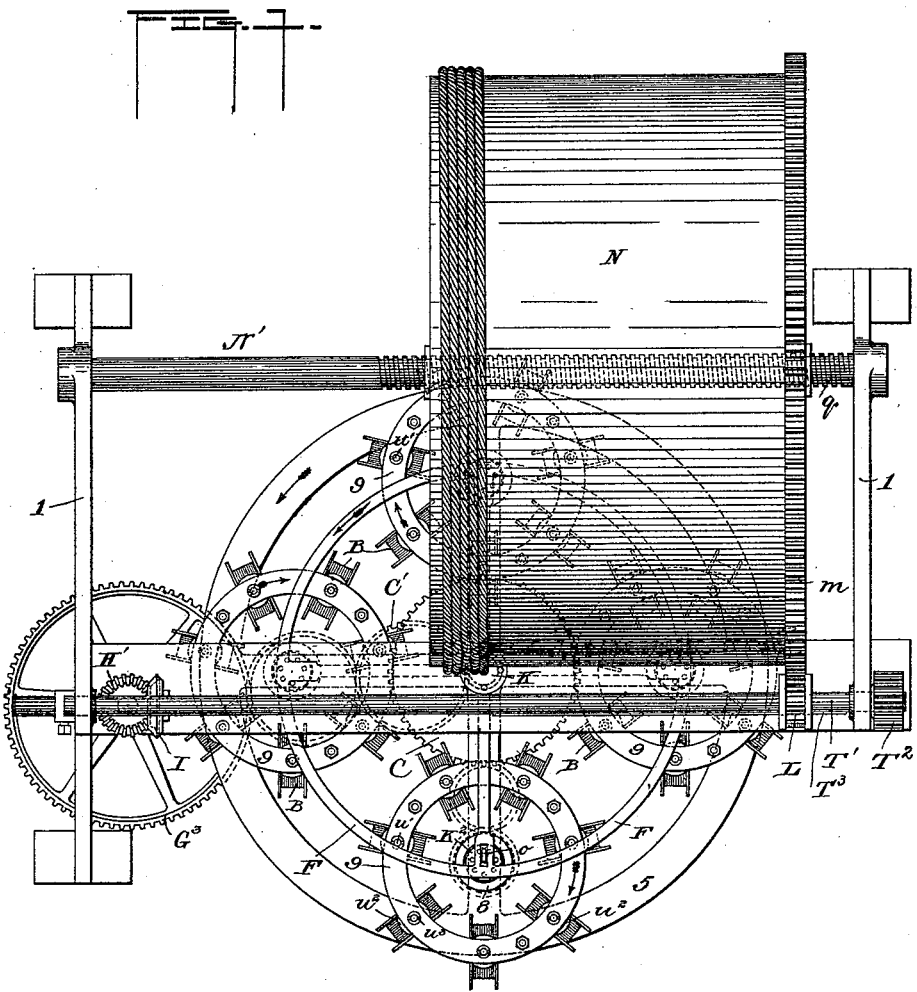
WITNESSES
INVENTOR

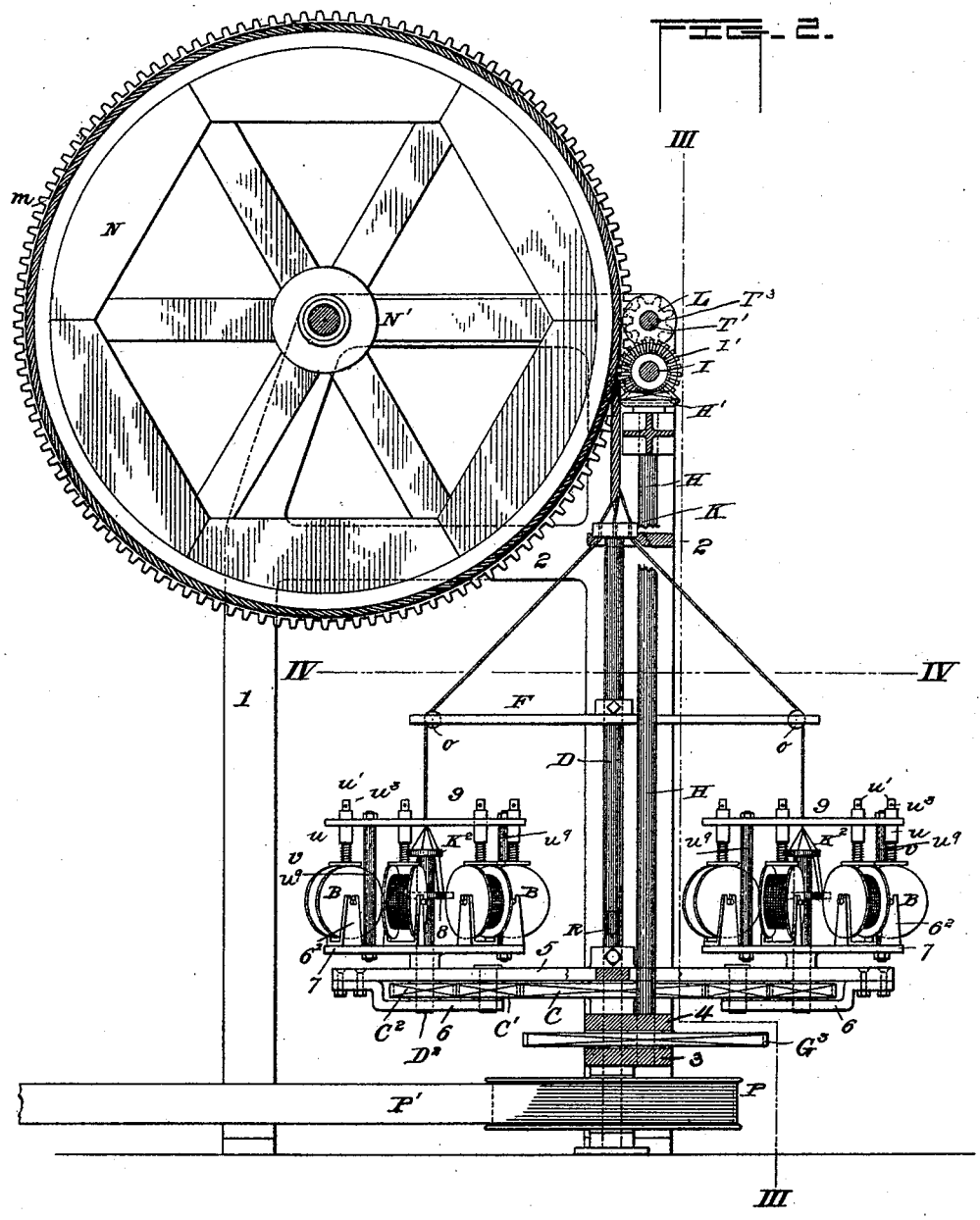

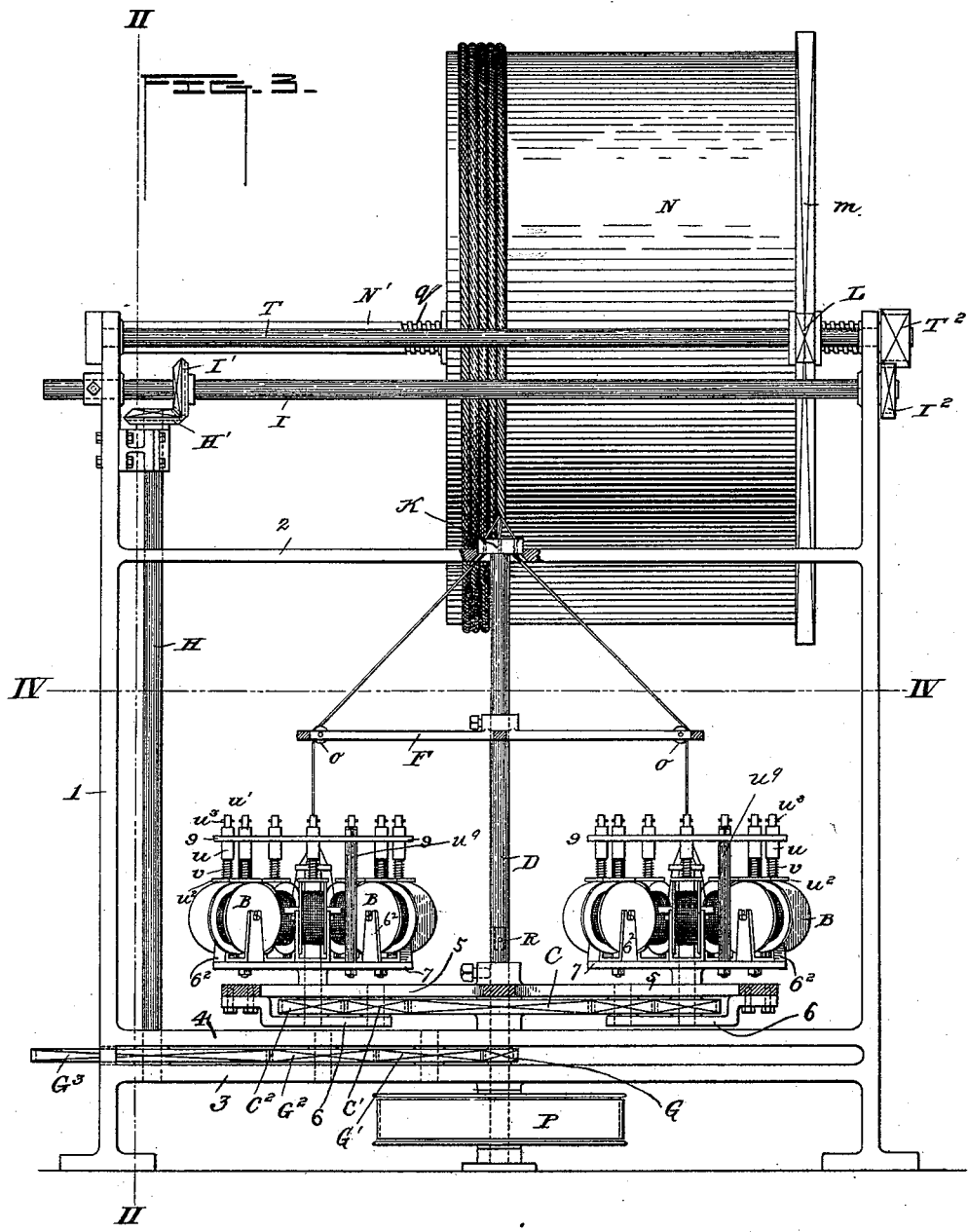

(No Model.) 5 Sheets—Sheet 4.
G. R. KRESS.
MACHINE FOR MAKING ROPE, &c.
No. 438,627. Patented Oct. 21, 1890.
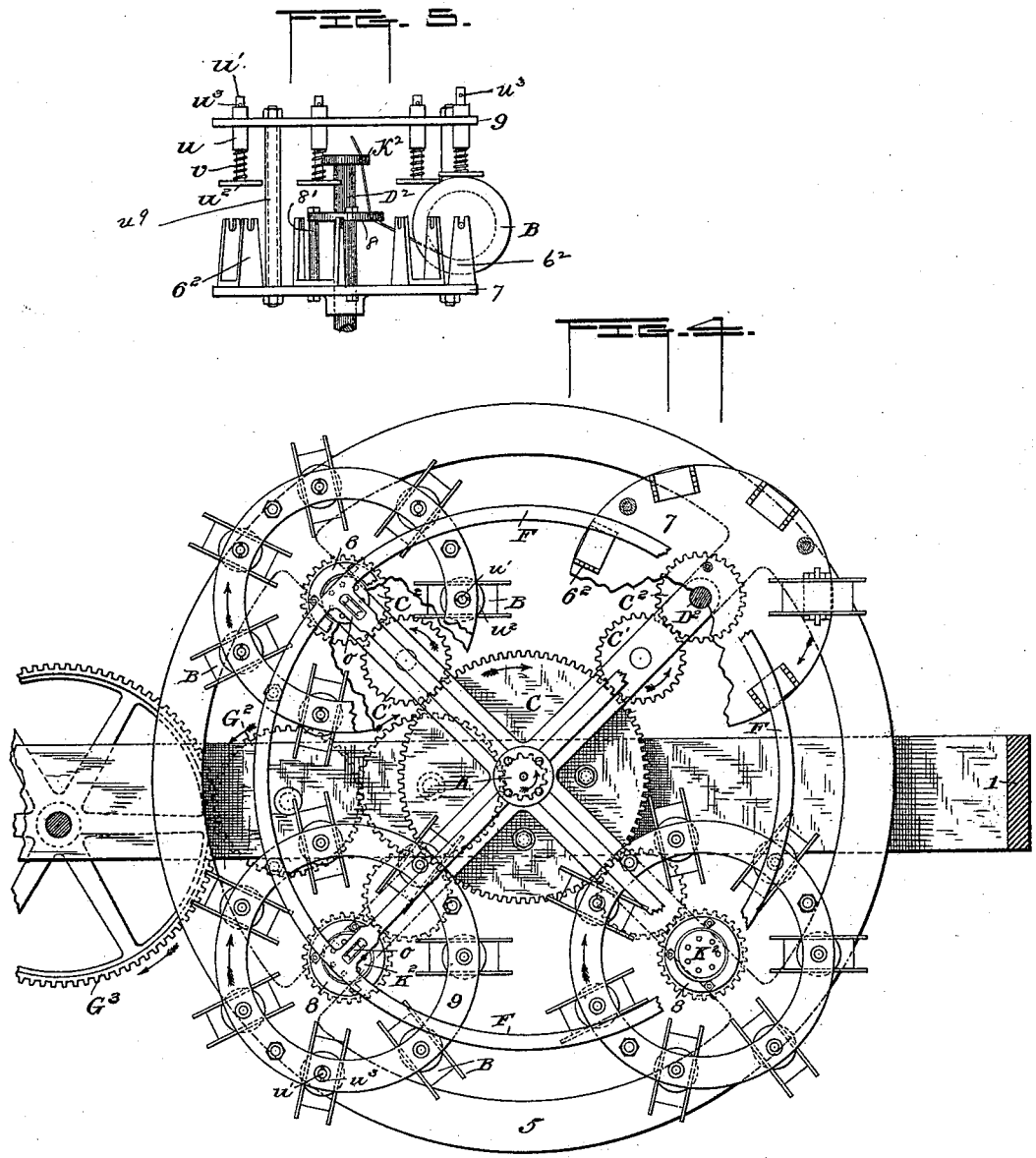
WITNESSES
INVENTOR
George R. Kress
by W. Bakewell & Sons
his attorneys (No Model.)
G. R. KRESS.
MACHINE FOR MAKING ROPE, &c.
No. 438,627. Patented Oct. 21, 1890.
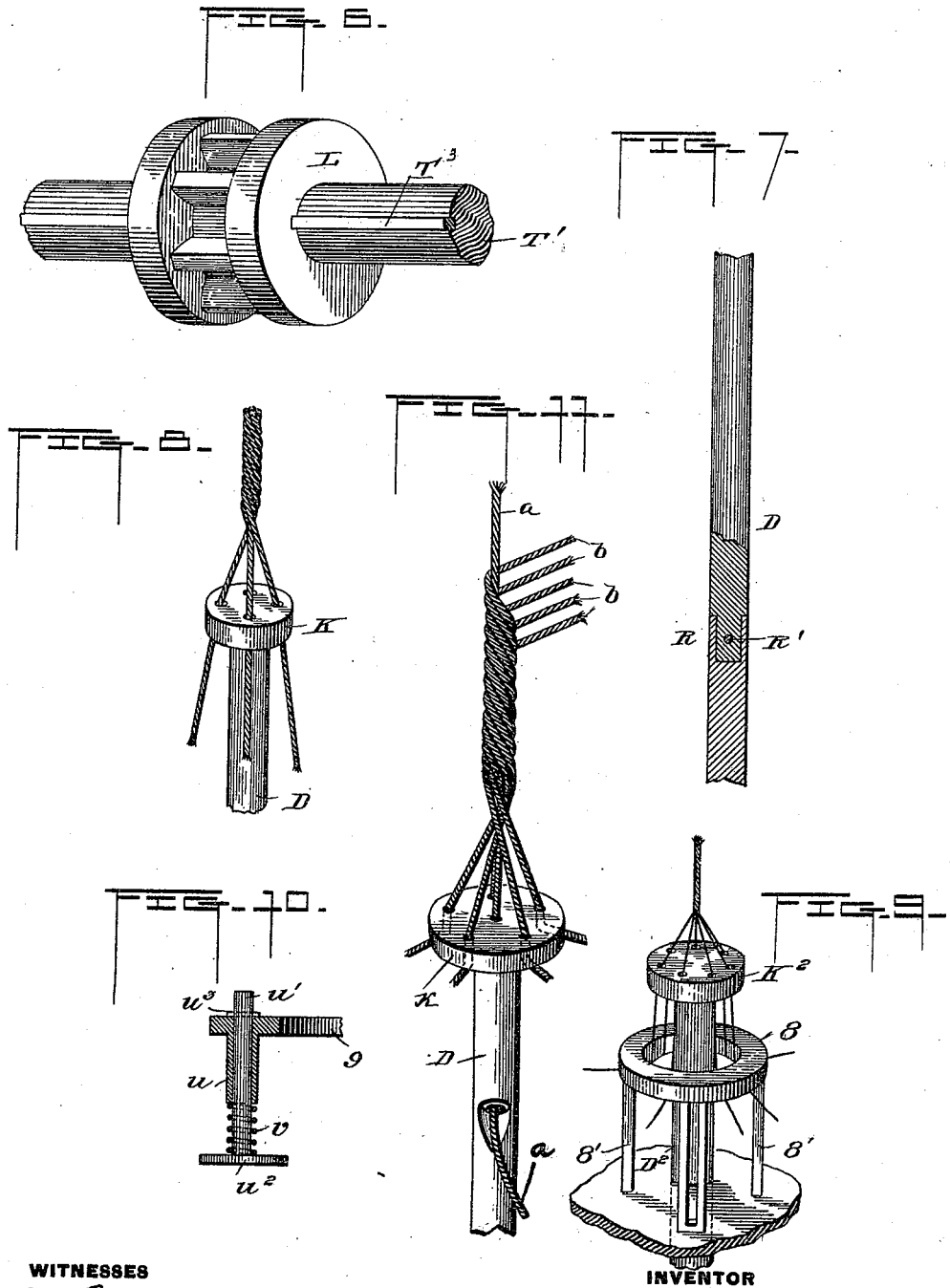
WITNESSES
INVENTOR
George R. Kress
by W. Bakewell & Sons
his attorneys

UNITED STATES PATENT OFFICE.

GEORGE R. KRESS, OF PITTSBURG, PENNSYLVANIA.

MACHINE FOR MAKING ROPE, &c.

SPECIFICATION forming part of Letters Patent No. 438,627, dated October 21, 1890.

Application filed August 18, 1888. Serial No. 283,160. (No model.)

*To all whom it may concern:*

Be it known that I, GEORGE R. KRESS, a citizen of the United States, residing at No. 108 Clark street, in the city of Pittsburg, county of Allegheny, and State of Pennsylvania, have invented a new and useful Machine for Making Rope, &c., of which the following is a specification.

My invention relates to machines for twisting rope, cord, or cable of cotton, hemp, wire, or other material of any number of strands or size desired directly from the single thread, strand, or wire. I attain this object by the mechanism illustrated in the accompanying drawings, in which—

Figure 1 is a top plan of a machine constructed in accordance with my invention. Fig. 2 is a side elevation thereof, partly in section. Fig. 3 is a front elevation thereof, also partly in section. Fig. 4 is a plan similar to Fig. 1, but on a larger scale and omitting the drum. Fig. 5 is a side view of one of the twister-heads detached. Fig. 6 is a perspective view of the sliding pinion for driving the winding drum or reel. Fig. 7 is a sectional detail of the jointed main shaft. Fig. 8 illustrates the various strands passing through the twisting-die to complete the rope. Fig. 9 shows the threads or wires as they come from the spools into one of the twisting-dies to make up one of the strands. Fig. 10 is a sectional elevation of the spool-tension device. Fig. 11 illustrates the various strands and a core passing through the twisting-die to form a finished rope, cord, or cable.

The frame 1 may be of appropriate construction to support the working parts, and contains as an essential the parallel bed-pieces 3 4. The main shaft is designated D, and the driving-pulley thereof is shown at P, the driving-belt P' connecting said pulley with any suitable motor. The shaft D extends up to and has a bearing by means of die K in the cross-bar 2 of the frame. As shown at R in Figs. 3 and 7, the shaft D is jointed to enable the spiders F and 5 to be lifted from the frame by removing the securing-pin R' and lifting the upper part of the shaft from the lower. The shaft D terminates in a die K, having a proper number of perforations, through which are passed the strands to be gathered or laid into a rope.

The master-gear wheel C is fixed in any suitable manner on a stationary part of the machine, and with it mesh as many trains of gearing (each composed of an idler C' and a pinion $C^2$) as there are twister-heads. The pinions $C^2$ are arranged upon the spindles $D^2$ of the twister-heads and communicate rotary motion thereto. These trains of gearing are arranged between the spider 5 and hanging housings 6.

Each twister-head is composed of a platform 7, fast to a spindle $D^2$. Upon each platform are erected standards $6^2$, which form bearings for freely-revolving spools B, on which are wound the yarns or wires to be twisted into strands to lay in the rope. Each spool is provided with a friction or pressure regulating device, consisting of a disk $u^2$, mounted upon a spindle $u'$ and arranged to bear upon the flanges of the spool. The spindles $u'$ have bearings in sockets $u$ in an annular frame 9, which is suitably supported in the twister-head above the spools by the posts $u^9$. Springs $v$, interposed between the disks and the sockets, serve to give the necessary pressure to the disks to cause proper tension on the spools, and also to permit of their being lifted to free the spools. The spindles $u''$ are secured in the ring 9 by pins $u^3$. The spindles $D^2$ terminate in strand-dies $K^2$. A gatherer 8, constructed as an annulus, is supported on posts 8', rising from the platform 7. This gatherer is substantially in the horizontal plane in which the threads leave the spools, and the threads from the spools pass under the gatherers, thence through the dies $K^2$, and thence to the die K.

A circular frame or spreader F is affixed to and turns with the shaft D above the twister-heads. The rim of this frame is provided with anti-friction rollers O, equal in number to the number of twister-heads, and standing over and in the axial lines of the spindles $D^2$, so that the strands rise vertically to the said rollers. The strands pass over these pulleys to the die K, and thence as a rope to the winding-drum N.

The drum N is mounted loosely upon a bar N', having a screw-thread $q$ to engage a corresponding screw-thread in the said drum, and on one end of said drum is a toothed wheel $m$, which is engaged by a pinion L, having flanges on each side to embrace the sides of the wheel m. The pinion L is mounted upon a shaft T', having a spline or feather T³, so as to cause the pinion L to turn with it while longitudinal movement of the pinion on the shaft is permitted. The shaft T is mounted in bearings in the frame 1, and is provided with a pinion T², which is engaged by a pinion I² on a shaft I, also borne by the frame. The shaft I is also provided with a bevel-gear I', which meshes with a bevel-gear H' on a vertical shaft H, which latter is rotated from the main shaft D by a train of gears G³, G², G', and G. Obviously as the shaft T is revolved the pinion L will rotate the drum, and the latter will be moved progressively along the bar N. By throwing the pinion I² out of gear with the pinion T², as by longitudinal movement of the shaft I in its bearings, or by disconnecting the bevel-gears H' I', or by other ordinary expedients, the drum is made free to be rotated for reeling the rope from the drum by hand or otherwise, and in so reeling off the rope the drum is reversed or brought back to the starting-point for again winding a rope as it is formed.

The shaft D is made separable, so as to provide for the removal of the die K and spreader F and the substitution of others, agreeably with the size of rope, cord, or cable to be formed.

The cord shown in Fig. 11 may be made by running the central cord or core a up through a hollow shaft D and a central opening in the die K, as shown. This core a will extend up straight and about it will be wound, substantially in the manner indicated in Fig. 11, the several strands b. These strands b will proceed from the several twister-heads. As many strands may be employed as there are twister-heads in the machine. In Fig. 11 I have shown five strands, and it is obvious that any one skilled in this art could readily construct the machine of this invention, so as to work four or five or any number of strands. The material of the core a and strands b will be such as may be necessary to form the kind of rope or cable required. The machine, as illustrated in the drawings, is constructed to twist all of the strands together without a core.

What I claim is—

1. The main shaft provided with a separable joint above its driver, combined with such driver, a spreader fast on the said shaft, a twisting-die also made fast thereon, and twisting-heads, substantially as described.

2. The combination of the frame, a main driving-shaft, a spider fast thereon, housings suspended from such spider, twister-heads arranged upon such spider, a fixed master-wheel, and gearing for driving the said heads arranged in trains and supported in the hanging housings, a spreader, a twisting-die on the main shaft above the twister-heads, a winding-drum to receive the finished rope, and means to traverse the drum as well as to rotate it, substantially as described.

3. In a machine for making rope and the like, the combination of a twister-head, an annular gatherer, and a twisting-die, substantially as described.

4. The combination, with the main driven shaft, twister-heads, and twisting-dies, of a winding-drum, a screw-threaded bar on which it is mounted and capable of being traversed, a toothed wheel on such drum, a sliding rotary pinion engaging such toothed wheel, a rotary shaft upon which such pinion is mounted to slide, a second shaft geared to the pinion-shaft, and intermediate gearing connecting said second shaft with the main driven shaft, substantially as described.

5. The combination, with the main driven shaft, twister-heads, and twisting-dies, of a winding-drum, a screw-threaded bar on which it is mounted and capable of being traversed, a toothed wheel on such drum, a sliding rotary pinion engaging the toothed wheel and having flanges on both sides to embrace the sides of the said wheel, a rotary shaft upon which said pinion is mounted to slide, a second shaft geared to the pinion-shaft, and intermediate gearing connecting said second shaft with the main driven shaft, substantially as described.

6. The combination of the winding-drum, a screw-threaded bar upon which it is mounted, a toothed wheel on said drum, a double-flanged pinion engaging such toothed wheel, a shaft upon which the pinion is mounted to slide and by it to be rotated and so traverse the drum by rotation on its screw-bar, and means, substantially as described, to drive the pinion-shaft, substantially as described.

GEO. R. KRESS.

Witnesses:
WINFIELD S. WILSON,
GEO. D. RIDDLE.